C. REUTZEL & H. FREY.
PLANTER.
APPLICATION FILED APR. 22, 1909.
927,284.
Patented July 6, 1909.
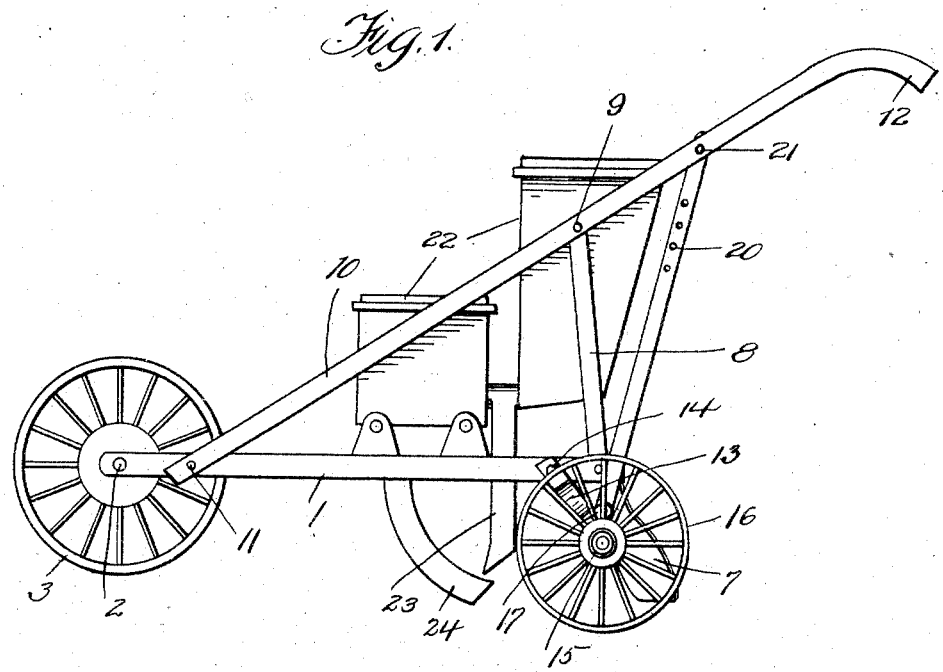
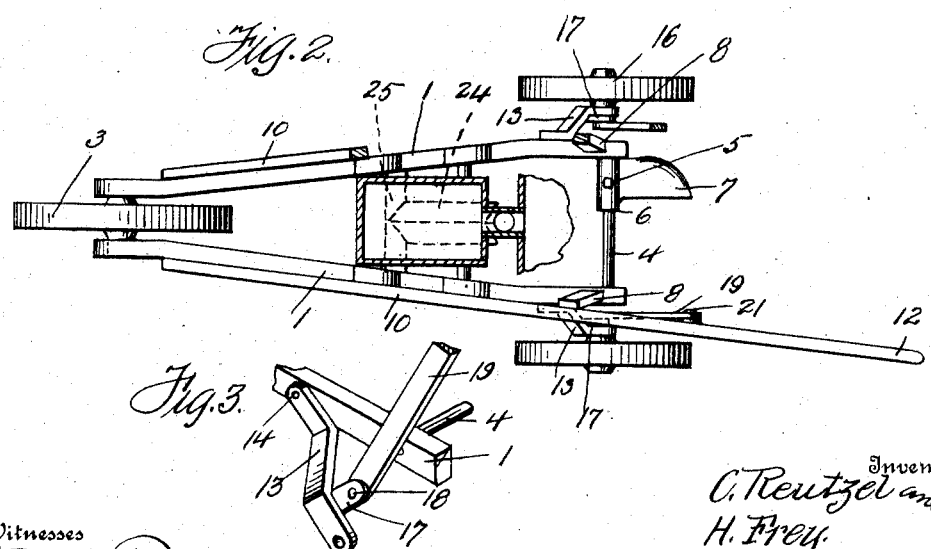
Witnesses
Samuel Payne
Inventors
C. Reutzel and
H. Frey.
By N. C. Evert & Co.
Attorneys.

UNITED STATES PATENT OFFICE.

CONRAD REUTZEL AND HENRY FREY, OF PITTSBURG, PENNSYLVANIA.

PLANTER.

No. 927,284.     Specification of Letters Patent.     Patented July 6, 1909.

Application filed April 22, 1909. Serial No. 491,429.

*To all whom it may concern:*

Be it known that we, CONRAD REUTZEL and HENRY FREY, citizens of the United States of America, residing at Pittsburg, in the county of Allegheny and State of Pennsylvania, have invented certain new and useful Improvements in Planters, of which the following is a specification, reference being had therein to the accompanying drawing.

This invention relates to planters, and the invention has for its object to provide a novel agricultural implement for sowing seeds, wherein novel means is provided in connection with the implement for making a furrow to receive the seed, and novel means for closing the furrow, both of said means being disposed relative to the rear axle or support of the implement, whereby furrows of various depths can be made according to the nature of the seed to be planted or sowed.

Another object of this invention is to provide a planter that will prepare soil for the reception of seed, without necessitating the use of a cultivator or special furrow covering machine.

We attain the foregoing objects by a construction of agricultural implement that will be hereinafter described in detail and claimed, reference being had to the accompanying drawings forming a part of this application, wherein there is illustrated the preferred embodiment of the invention, but it is understood that the structural elements of the implement can be varied or changed in a manner which will fall within the scope of the claims hereunto appended.

Referring to the drawings:—Figure 1 is a side elevation of the planter, Fig. 2 is a plan of the same partly broken away and partly in section, and Fig. 3 is a perspective view of a portion of the planter.

Referring to the drawings in detail, 1 indicates a pair of longitudinally-extending converging beams having the forward ends thereof connected together by an axle 2, upon which is revolubly mounted a wheel 3. The rear end of beams 1 are connected together by a transverse rod 4, upon which is mounted an adjustable sleeve 6 provided with a depending curved furrow covering plate 7. The sleeve 6 is maintained in its adjusted position upon the rod 4 through the medium of a set screw 5 carried by said sleeve.

8 designates uprights carried by the rear ends of the beams 1, said uprights having the upper ends thereof connected, as at 9, to angularly disposed converging handle bars 10, said bars having the forward ends thereof connected to the beams 1, as at 11, while the rear ends of said bars terminate in handles 12.

13 designates hangers pivotally connected, as at 14, adjacent to the rear ends of the beams 1. The lower ends of these hangers are provided with stub axles 15 upon which are mounted the wheels 16 adapted to support the rear end of the planter. The hangers 13 are provided with apertured lugs 17 and pivotally connected to said lugs, as at 18, are angularly disposed bars 19, said bars having the upper ends thereof apertured, as at 20, and adjustably connected to the handle bars 10 by pins 21.

The beams 1, handle bars 10, and uprights 8 support two seed boxes 22 having a common outlet spout 23. These seed boxes and the spout 23 are of a conventional form adapted to deposit seeds when the implement is in operation, and in order that the seeds can be properly sown, a furrow making shear or point is used in connection with the implement. This furrow making point comprises a depending curved share 24, carried by a transverse brace 25 connecting the beams 1. The share is substantially V-shaped in cross section and is adapted to make a V-shaped furrow for the seeds deposited by the implement.

It is apparent that through the medium of the angularly disposed bars 19 the elevation of the rear end of the beams 1 relative to the soil over which the same passes can be adjusted, whereby the furrow making share 24 will produce furrows of various depths, and through the medium of the laterally adjustable sleeve 6, and the furrow covering blade 7, the furrow can be closed or partially closed by said blade. The adjustment of the blade 7 permits of the proper amount of soil being returned to the furrow to cover the seed and insure its rapid development.

Having now described our invention what we claim as new, is:—

1. In a planter, the combination with longitudinal converging beams, a wheel revolubly mounted between the forward ends of said beams, uprights carried by the rear ends of said beams, and handle bars connected to said uprights and to the forward ends of said beams, of hangers pivotally carried by the rear ends of said beams, a wheel revolubly supported by each hanger, a lug carried by each hanger, and a bar pivotally connected to the lug of each hanger and adapted to be adjustably connected to said handle bars, substantially as described.

2. In a planter, the combination with longitudinal converging beams, a wheel revolubly mounted between the forward ends of said beams, uprights carried by the rear ends of said beams, and handle bars connected to said uprights and to the forward ends of said beams, of hangers pivotally carried by the rear ends of said beams, a wheel revolubly supported by each hanger, a lug carried by each hanger, a bar pivotally connected to the lug of each hanger and adapted to be adjustably connected to said handle bars, a depending curved furrow making share supported by said beams, and a laterally adjustable furrow covering blade supported by said beams, substantially as described.

3. In a planter, the combination with longitudinal beams, a wheel revolubly supported between the forward ends of said beams, uprights carried by the rear ends of said beams, handle bars connecting said uprights and the forward ends of said beams, seed boxes arranged between said handle bars, and a common spout for said seed boxes, of hangers pivotally connected to the rear ends of said beams, a wheel revolubly supported by each hanger, angularly disposed bars pivotally connected to said hangers and adapted to be adjustably connected to said handle bars, a depending curved furrow making share supported by said beams in front of said spout, and a laterally adjustable furrow closing blade supported by said beams in the rear of said spout, substantially as described.

In testimony whereof we affix our signatures in the presence of two witnesses.

CONRAD REUTZEL.
HENRY FREY.

Witnesses:
  K. H. BUTLER,
  A. J. TRIGG.